(12) United States Patent
Wollmann

(10) Patent No.: US 7,451,711 B1
(45) Date of Patent: Nov. 18, 2008

(54) NO-TILL DRILL LIQUID FERTILIZER APPLICATOR SYSTEM

(75) Inventor: Andrew S. Wollmann, Faulkton, SD (US)

(73) Assignee: Thunder Bird H.B. Inc., Faulkton, SD (US)

( * ) Notice: Subject to any disclaimer, the term of this patent is extended or adjusted under 35 U.S.C. 154(b) by 297 days.

(21) Appl. No.: 11/278,696

(22) Filed: Apr. 5, 2006

(51) Int. Cl.
*A01C 23/00* (2006.01)

(52) U.S. Cl. ...................................... 111/123

(58) Field of Classification Search ................ 111/118, 111/119, 123–127, 129
See application file for complete search history.

(56) References Cited

U.S. PATENT DOCUMENTS

| | | | |
|---|---|---|---|
| 2,888,891 A | 6/1959 | Ackley |
| 2,993,626 A | 7/1961 | Gildersleeve |
| 3,653,550 A | 4/1972 | Williams |
| 4,565,141 A | 1/1986 | Kopecky |
| 4,580,506 A | 4/1986 | Fleischer et al. |
| 4,656,957 A | 4/1987 | Williamson et al. |
| 4,911,090 A | 3/1990 | Schimke |
| 4,998,488 A | 3/1991 | Hansson |
| 5,027,724 A | 7/1991 | Patacek et al. |
| 5,136,954 A | 8/1992 | Fetaz et al. |
| 5,271,343 A | 12/1993 | House |
| 5,852,982 A | 12/1998 | Peter |
| 6,082,274 A | 7/2000 | Peter |
| 6,220,191 B1 | 4/2001 | Peter |
| 6,397,767 B1 | 6/2002 | Dietrich, Sr. |
| 6,453,832 B1 | 9/2002 | Schaffert |
| 6,763,773 B2 | 7/2004 | Schaffert |
| 2002/0195033 A1 | 12/2002 | Schaffert |
| 2004/0255834 A1 | 12/2004 | Schaffert |
| 2005/0051068 A1 | 3/2005 | Swanson |
| 2005/0072583 A1 | 4/2005 | Rowlett et al. |

*Primary Examiner*—Christopher J. Novosad

(57) ABSTRACT

A no-till drill liquid fertilizer applicator system for effectively protecting a fertilizer dispensing tube on a no-till drill while dispensing liquid fertilizer with small grain seed. The no-till drill liquid fertilizer applicator system includes a receiver tube, a guide tube attached to the receiver tube to receive a fertilizer tube, and a wear member removably received within the receiver tube. The fertilizer tube extends through the guide tube to within a guide channel within an upper portion of the wear member and continues to a rear portion of the wear member to dispense the liquid fertilizer upon a seed bed.

19 Claims, 10 Drawing Sheets

NO-TILL DRILL LIQUID FERTILIZER APPLICATOR SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to liquid fertilizer applicators and more specifically it relates to a no-till drill liquid fertilizer applicator system for effectively protecting a fertilizer dispensing tube on a no-till drill while dispensing liquid fertilizer with small grain seed.

2. Description of the Related Art

Any discussion of the prior art throughout the specification should in no way be considered as an admission that such prior art is widely known or forms part of common general knowledge in the field.

Liquid fertilizer systems for seed drills are well-known in the art. Conventional liquid fertilizer systems utilize an exposed fertilizer dispensing tube that is prone to being engaged by rocks and other foreign objects resulting in damage to the dispensing tube (e.g. cuts, breaks, etc.). When a dispensing tube is damaged, this not only negatively affects the dispensing of the liquid fertilizer but it also results in downtime for the seed drill while the dispensing tube is being repaired.

While conventional fertilizer dispensing tubes may be suitable for the particular purpose to which they address, they are not as suitable for effectively protecting a fertilizer dispensing tube on a no-till drill while dispensing liquid fertilizer with small grain seed. Conventional fertilizer dispensing systems are prone to becoming damaged during usage.

In these respects, the no-till drill liquid fertilizer applicator system according to the present invention substantially departs from the conventional concepts and designs of the prior art, and in so doing provides an apparatus primarily developed for the purpose of effectively protecting a fertilizer dispensing tube on a no-till drill while dispensing liquid fertilizer with small grain seed.

BRIEF SUMMARY OF THE INVENTION

In view of the foregoing disadvantages inherent in the known types of liquid fertilizer systems now present in the prior art, the present invention provides a new no-till drill liquid fertilizer applicator system construction wherein the same can be utilized for effectively protecting a fertilizer dispensing tube on a no-till drill while dispensing liquid fertilizer with small grain seed.

The general purpose of the present invention, which will be described subsequently in greater detail, is to provide a new no-till drill liquid fertilizer applicator system that has many of the advantages of the liquid fertilizer systems mentioned heretofore and many novel features that result in a new no-till drill liquid fertilizer applicator system which is not anticipated, rendered obvious, suggested, or even implied by any of the prior art liquid fertilizer systems, either alone or in any combination thereof.

To attain this, the present invention generally comprises a receiver tube, a guide tube attached to the receiver tube to receive a fertilizer tube, and a wear member removably received within the receiver tube. The fertilizer tube extends through the guide tube to within a guide channel within an upper portion of the wear member and continues to a rear portion of the wear member to dispense the liquid fertilizer upon a seed bed.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a no-till drill liquid fertilizer applicator system that will overcome the shortcomings of the prior art devices.

A second object is to provide a no-till drill liquid fertilizer applicator system for effectively protecting a fertilizer dispensing tube on a no-till drill while dispensing liquid fertilizer with small grain seed.

Another object is to provide a no-till drill liquid fertilizer applicator system that may be utilized upon various types of no-till seed drills such as but not limited to JOHN DEERE and CASE IH brand no-till drills.

An additional object is to provide a no-till drill liquid fertilizer applicator system that reduces the wearing and damage to the liquid fertilizer dispensing tube.

A further object is to provide a no-till drill liquid fertilizer applicator system that increases the percentage of operating time of a no-till drill.

Another object is to provide a no-till drill liquid fertilizer applicator system that utilizes a wear member that is easily replaced.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
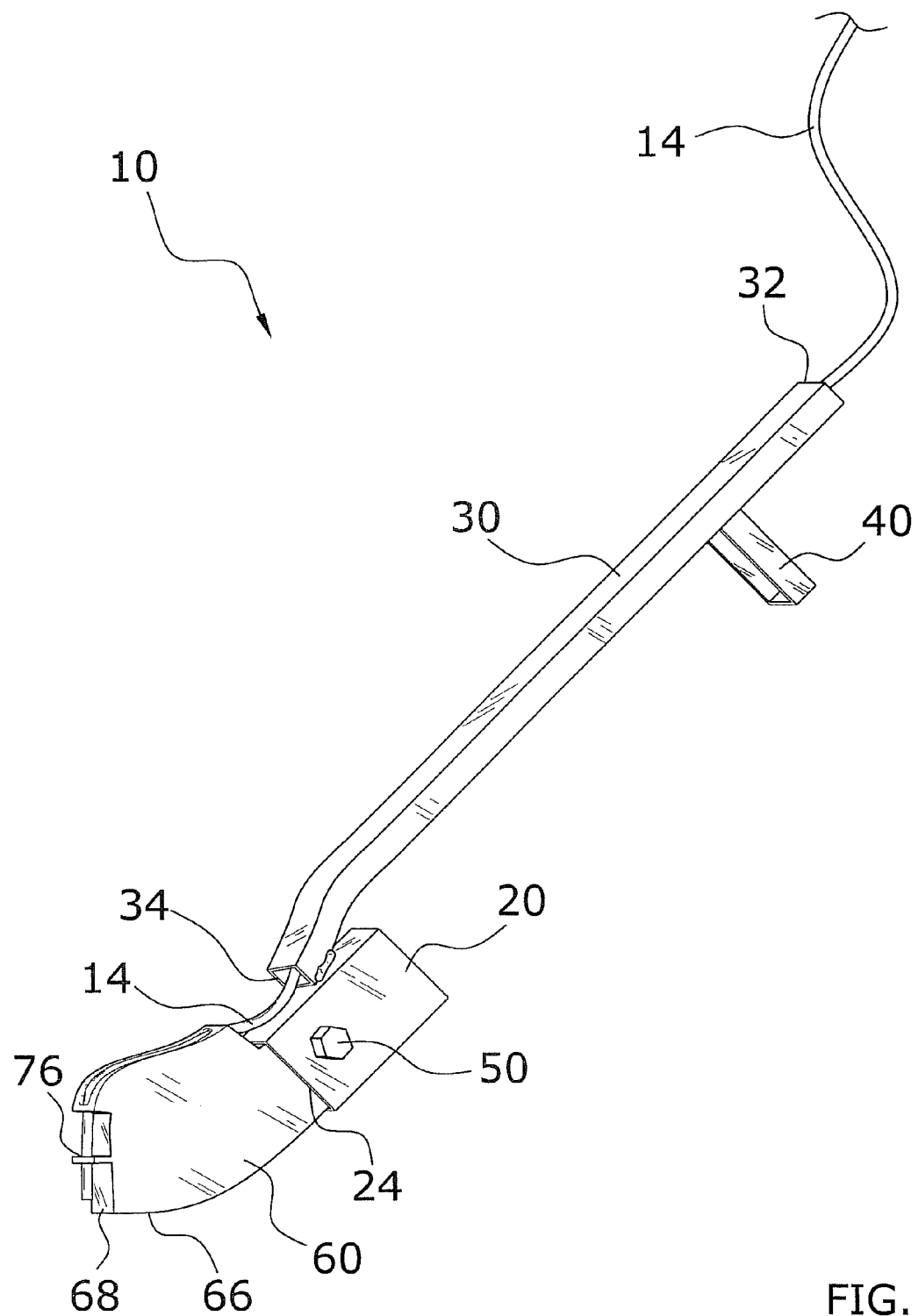
FIG. 1 is an upper perspective view of the present invention.

Turning now descriptively to the drawings, in which similar reference characters denote similar elements throughout the several views, FIGS. 1 through 9 illustrate a no-till drill liquid fertilizer applicator system 10, which comprises a receiver tube 20, a guide tube 30 attached to the receiver tube 20 to receive a fertilizer tube 14, and a wear member 60 removably received within the receiver tube 20. The fertilizer tube 14 extends through the guide tube 30 to within a guide channel 70 within an upper portion of the wear member 60 and continues to a rear portion 68 of the wear member 60 to dispense the liquid fertilizer upon a seed bed.

B. Receiver Tube

Figure 2:
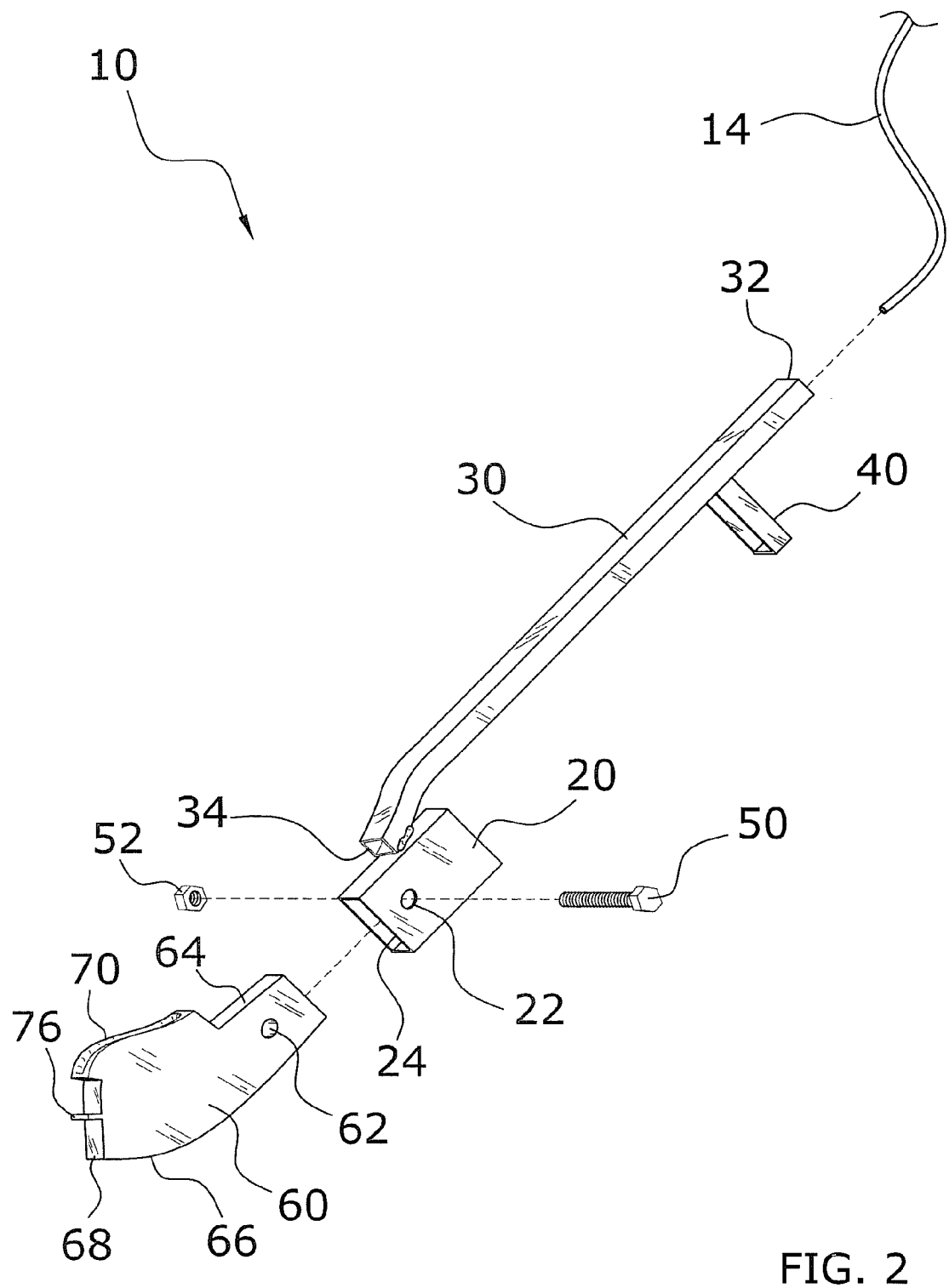
FIG. 2 is an exploded upper perspective view of the present invention.
Figure 3:
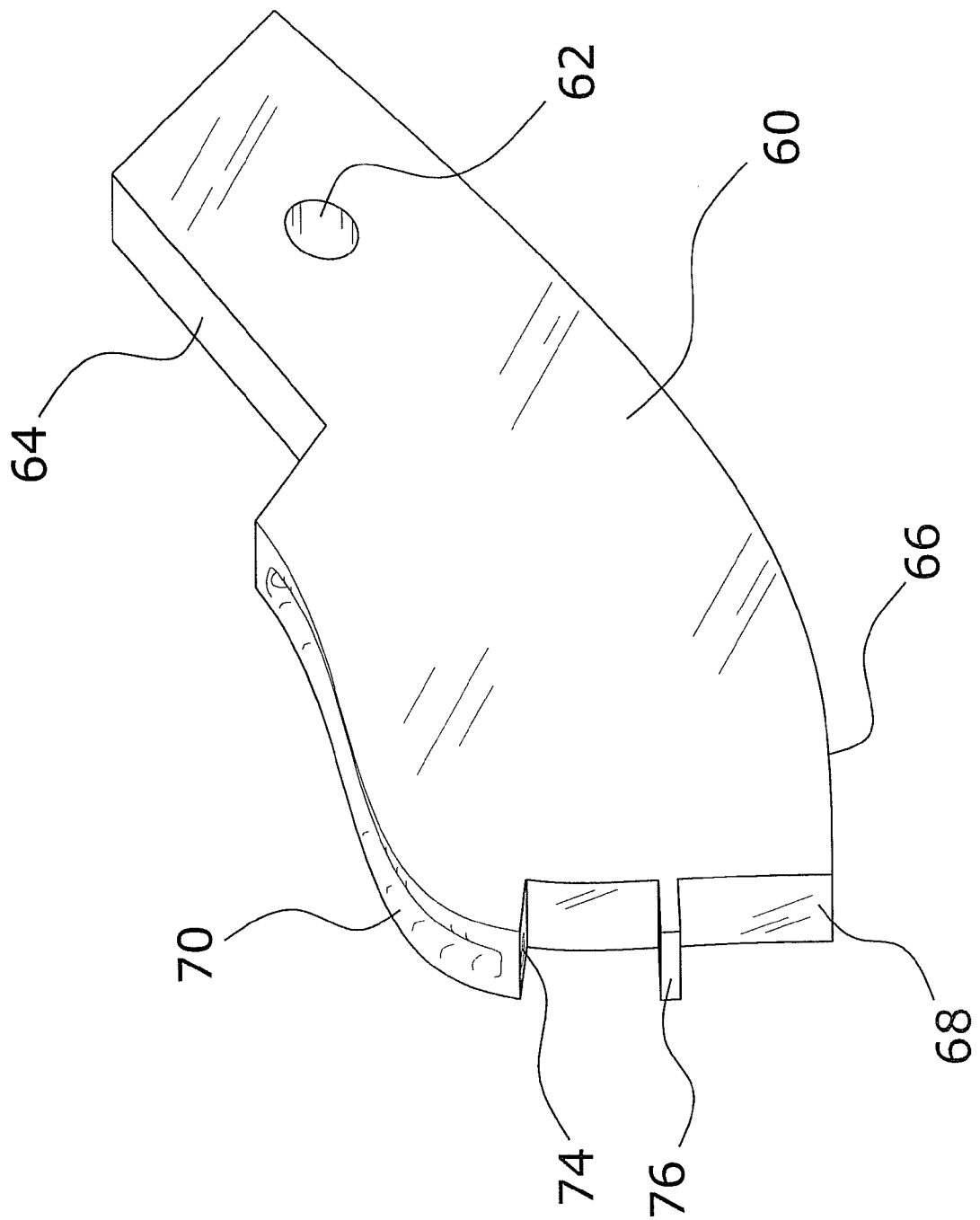
FIG. 3 is a magnified upper perspective view of the wear member.

A receiver tube 20 is provided that removably receives the wear member 60. The receiver tube 20 may be comprised of various configurations and structures capable of removably receiving the wear member 60. FIGS. 1 and 2 best illustrate the receiver tube 20 with the wear member 60 removably positioned within the receiver tube 20.

The receiver tube 20 includes a receiver opening 24 that receives the wear member 60 as shown in FIG. 2 of the drawings. The receiver opening 24 preferably is comprised of a rectangular cross section.

The receiver tube 20 preferably includes at least one first aperture 22 as shown in FIG. 2 of the drawings. The wear member 60 includes a second aperture 62 aligned with the first aperture 22 as further shown in FIG. 2 of the drawings. A fastener 50 extends through the first aperture 22 and the second aperture 62 for securing the wear member 60 within the receiver tube 20 and further extends through an aperture within the shaft 12 of the no-till drill for securing the receiver tube 20 to the shaft 12. A nut 52 or other member is attached to the distal portion of the fastener 50 to secure the fastener 50 within the receiver tube 20 and the wear member 60.

C. Guide Tube

Figure 4:
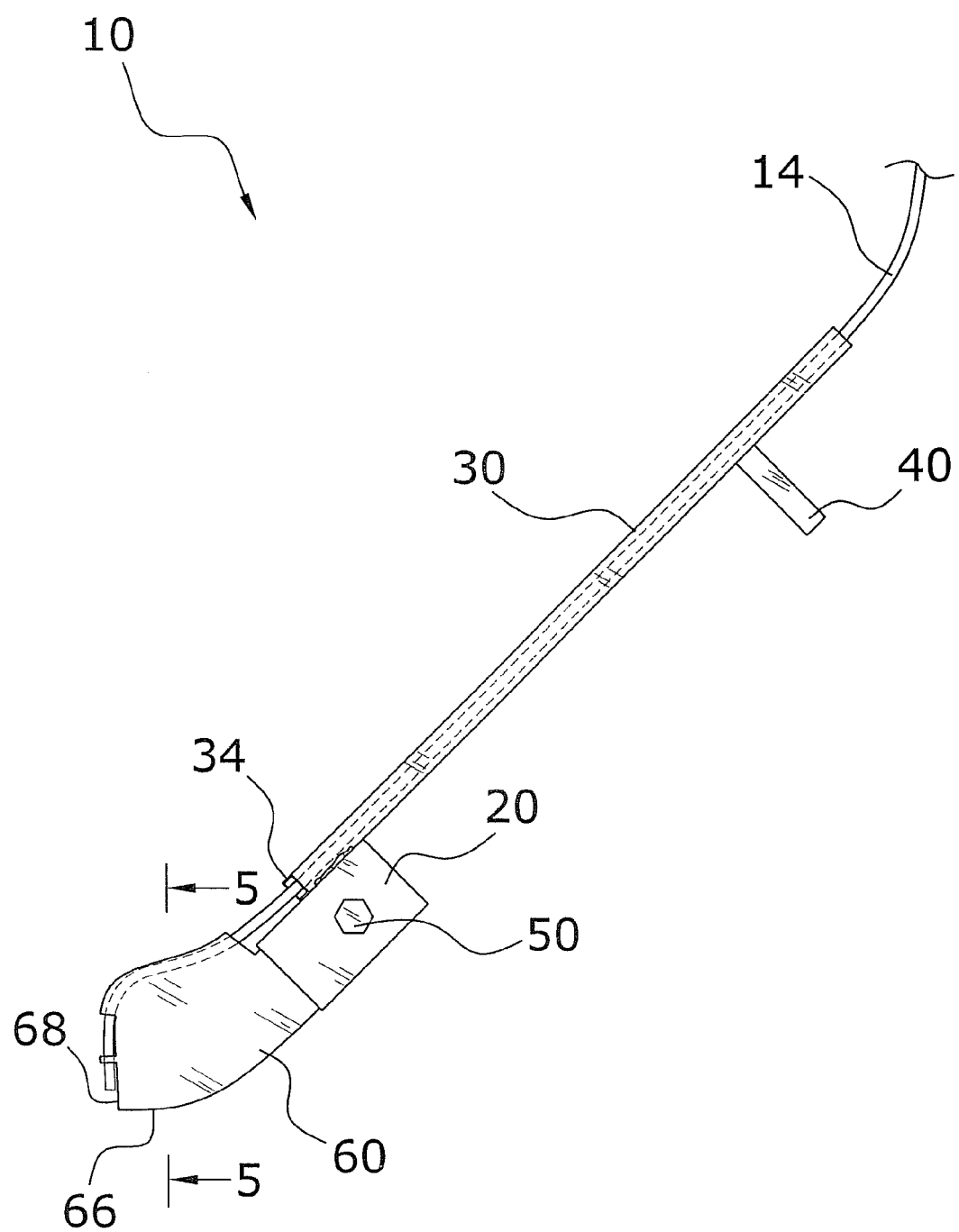
FIG. 4 is a side view of the present invention.
Figure 5:
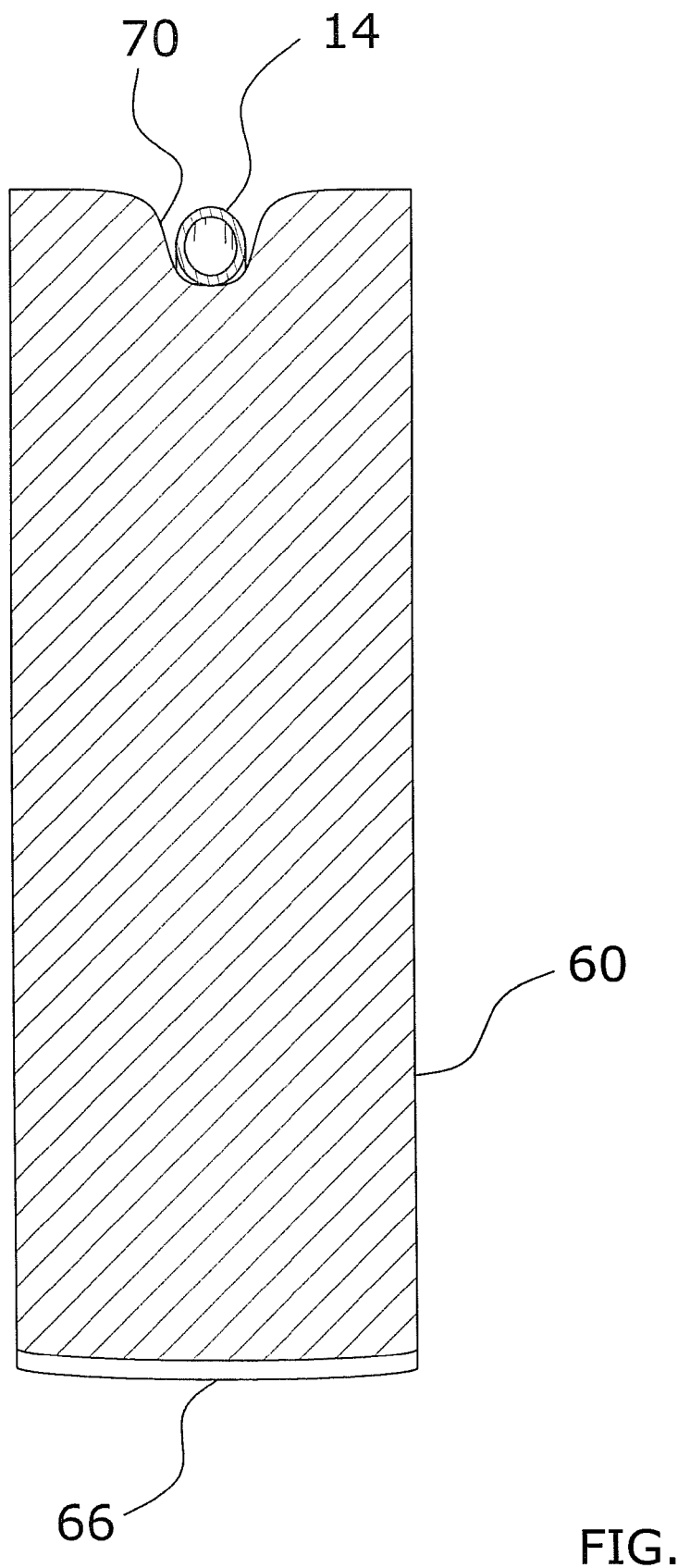
FIG. 5 is a cross sectional view taken along line 5-5 of FIG. 4.

A guide tube 30 is preferably attached to the receiver tube 20 as illustrated in FIGS. 1, 2 and 4. The guide tube 30 is formed to receive and protect a fertilizer tube 14 as illustrated in FIGS. 1 and 4 of the drawings. The guide tube 30 may be comprised of various cross sectional shapes and sizes capable of receiving the fertilizer tube 14.

The guide tube 30 is comprised of an elongated structure having a first end 32 and a second end 34. The fertilizer tube 14 enters the first end 32 and exits the second end 34 as shown in FIGS. 1 and 4 of the drawings. The second end 34 is preferably near the wear member 60 to allow the fertilizer tube 14 to extend into the guide channel 70 with only a small portion of the fertilizer tube 14 exposed.

Figure 6:
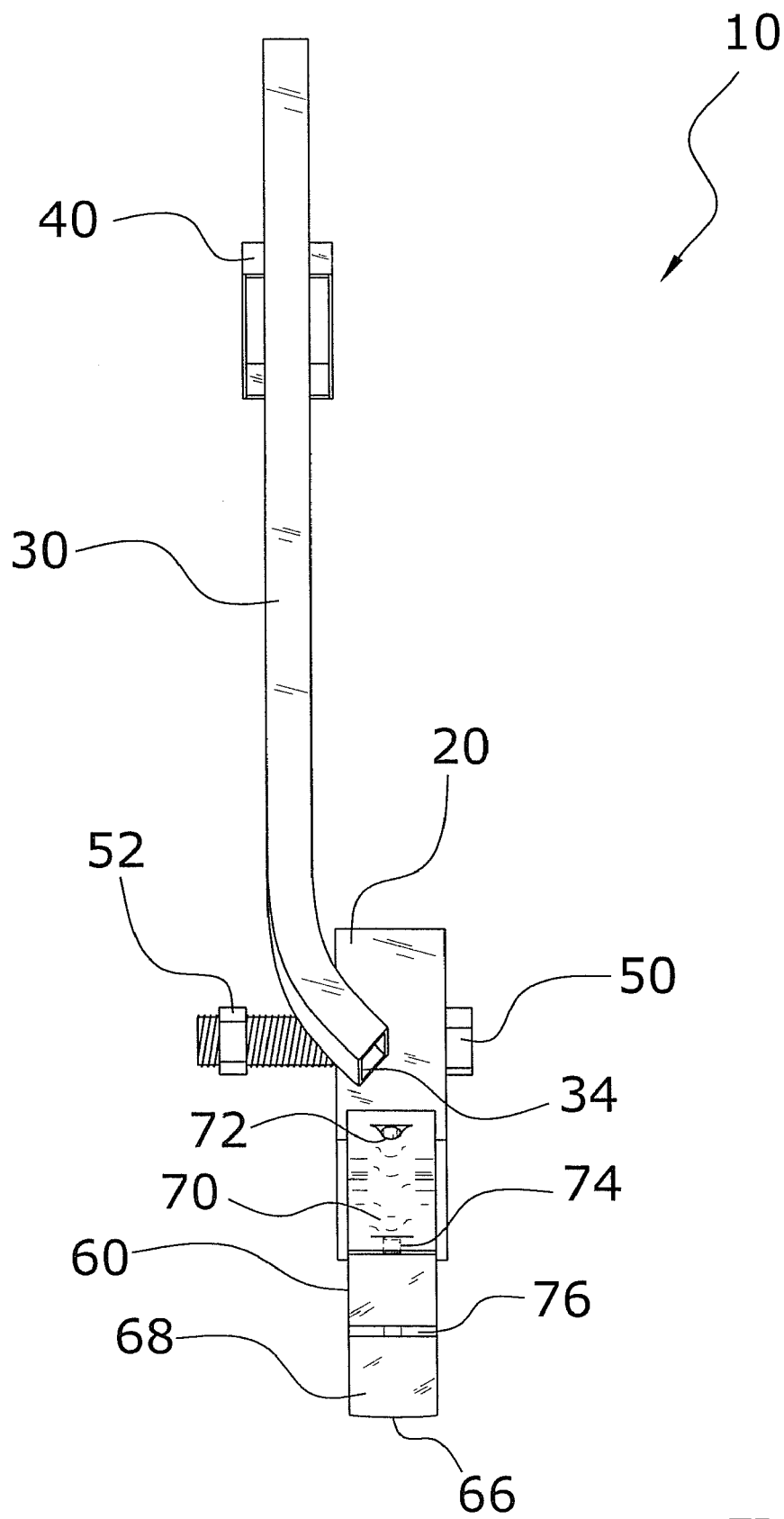
FIG. 6 is a rear view of the present invention.

A collar 40 is preferably attached to the guide tube 30 as shown in FIGS. 1, 2, 4 and 5 of the drawings. The collar 40 is formed to receive a shaft 12 of a no-till drill. The collar 40 is preferably comprised of a rectangular structure as shown in FIGS. 2 and 6 of the drawings. The collar 40 has a central opening that slidably extends over a shaft 12 on the no-till drill that the receiver tube 20 is attached to. The collar 40 is preferably comprised of a metal band attached to the guide tube 30, however other configurations may be utilized.

D. Wear Member

The wear member 60 is removably received within the receiver opening 24 of the receiver tube 20 and protects the end portion of the fertilizer tube 14 during usage thereof. FIGS. 1, 2 and 2 provide the best illustration of the wear member 60. The wear member 60 is preferably comprised of a wear resistant material for engaging a ground surface such as but not limited to plastic. The wear member 60 preferably has a width of greater than one inch to provide adequate floatation upon the ground surface and for forcing the seed into the seed bed. The height of the wear member 60 is at least two times greater than the width of the wear member 60 as illustrated in FIG. 6 of the drawings.

The wear member 60 preferably includes a neck portion 64 that has a cross sectional shape corresponding to the receiver opening 24 as shown in FIG. 2 of the drawings. The neck portion 64 preferably is narrower than a main body of the wear member 60 as further illustrated in FIG. 2 of the drawings.

Figure 7:
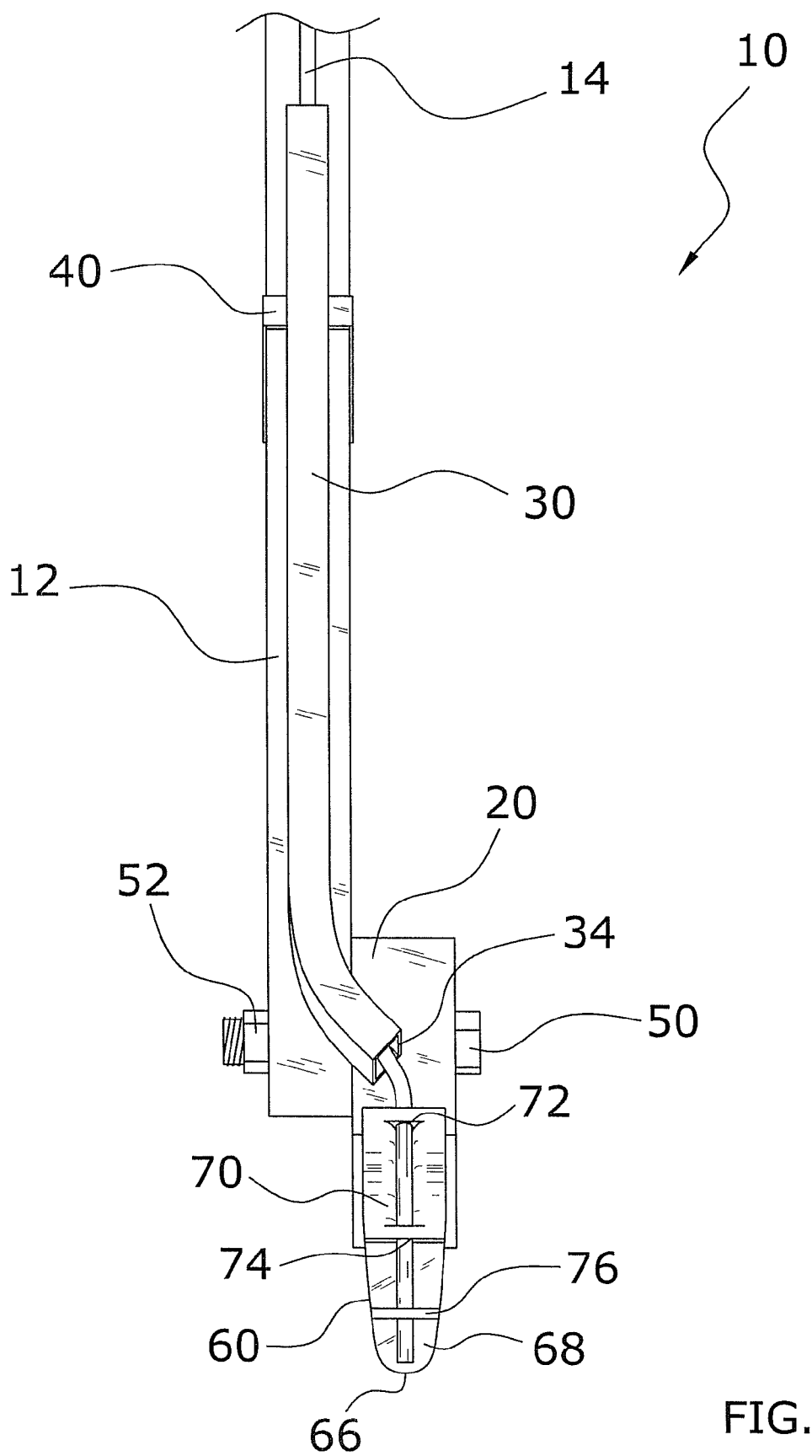
FIG. 7 is a rear view of the present invention attached to a no-till drill.

The wear member 60 receives and protects the end portion of the fertilizer tube 14 as shown in FIGS. 1 and 4 of the drawings. The fertilizer tube 14 terminates adjacent to a rear portion 68 of the wear member 60 near and above the lower surface 66 of the wear member 60 as best illustrated in FIG. 7 of the drawings. The dispensing end of the fertilizer tube 14 is preferably positioned slightly above the lower surface 66 of the wear member 60 to prevent damage and plugging of the fertilizer tube 14.

The wear member 60 has a lower surface 66 that engages a ground surface and a tapered leading edge. The tapered leading edge is preferably a curved structure to provide for gliding over objects and debris such as but not limited to rocks. The lower surface 66 of the wear member 60 is preferably comprised of a substantially flat and straight structure as best illustrated in FIG. 4 of the drawings.

The wear member 60 preferably includes a guide channel 70 for receiving the end portion of the fertilizer tube 14 as shown in FIGS. 1 through 7 of the drawings. The guide channel 70 preferably extends along an upper portion of the wear member 60 and downwardly along to the rear portion 68. The guide channel 70 preferably has a rounded cross sectional structure as best illustrated in FIGS. 4 and 6 of the drawings. The guide channel 70 preferably has a depth equal to at least a diameter of the fertilizer tube 14 to protect the side portions of the fertilizer tube 14 as illustrated in FIG. 4 of the drawings.

A first guide aperture 72 extends within the wear member 60 and is connected to the guide channel 70 as best illustrated in FIG. 6 of the drawings. The first guide aperture 72 receives the fertilizer tube 14 as illustrated in FIG. 7 of the drawings. The first guide aperture 72 is preferably substantially parallel to an initial path of the guide channel 70 to allow the fertilizer tube 14 to extend to the guide channel 70 without unnecessary bending.

A second guide aperture 74 extends within the wear member 60 and is connected to the guide channel 70 opposite of the first guide aperture 72 as best illustrated in FIG. 6 of the drawings. The second guide aperture 74 receives the fertilizer tube 14 as further shown in FIG. 7 of the drawings. The second guide aperture 74 is preferably substantially parallel to an end path of the guide channel 70 as further shown in FIG. 4 of the drawings (the phantom lines showing the path of the fertilizer tube 14).

A lower guide member 76 preferably extends from the rear portion 68 of the wear member 60 to receive and retain the end portion of the fertilizer tube 14 as shown in FIGS. 1 through 7 of the drawings. The lower guide member 76 includes an aperture that receives the end portion of the fertilizer tube 14.

E. Operation of Invention

Figure 8A:
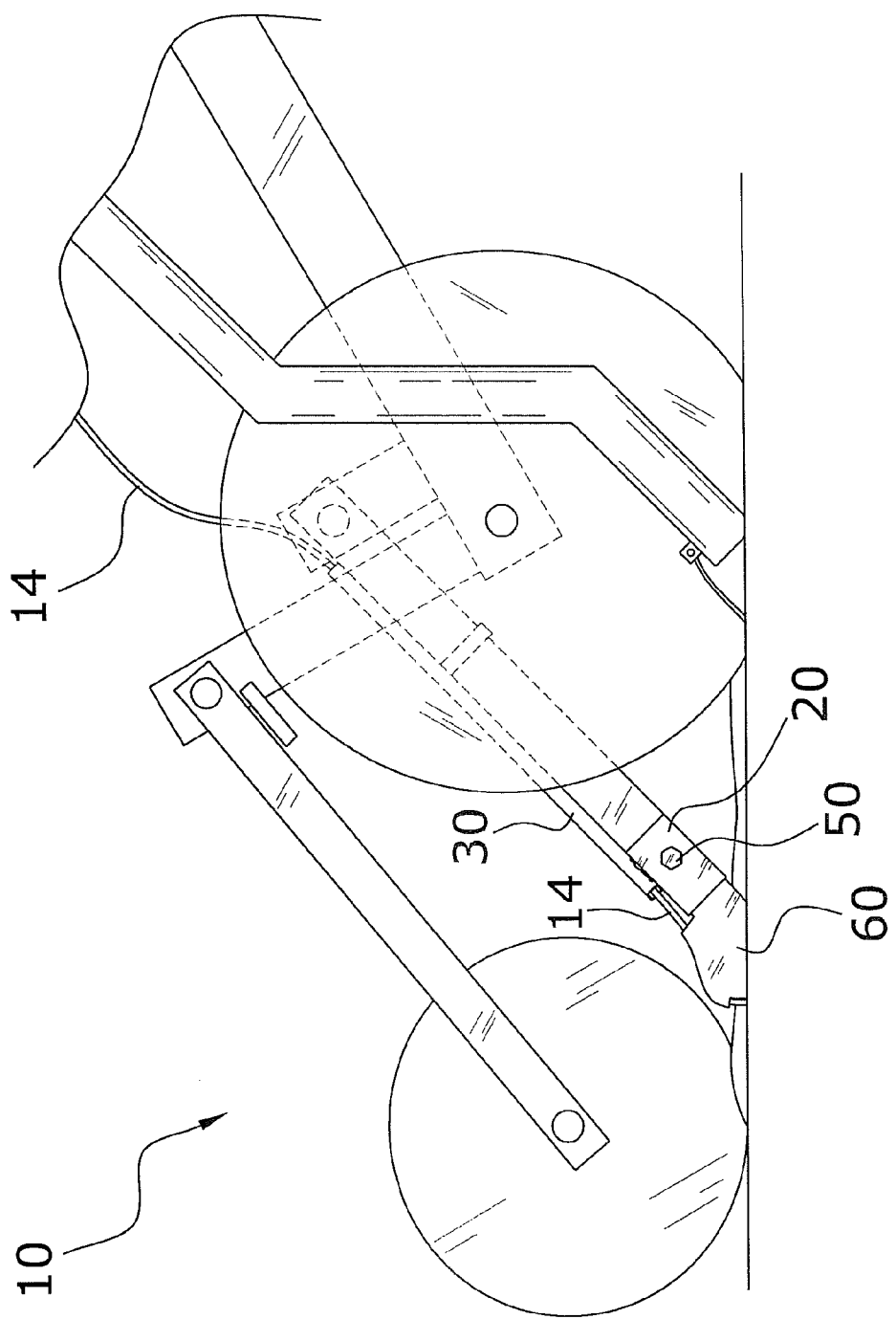
FIG. 8a is a side view of the present invention attached to a no-till drill in use.
Figure 8B:
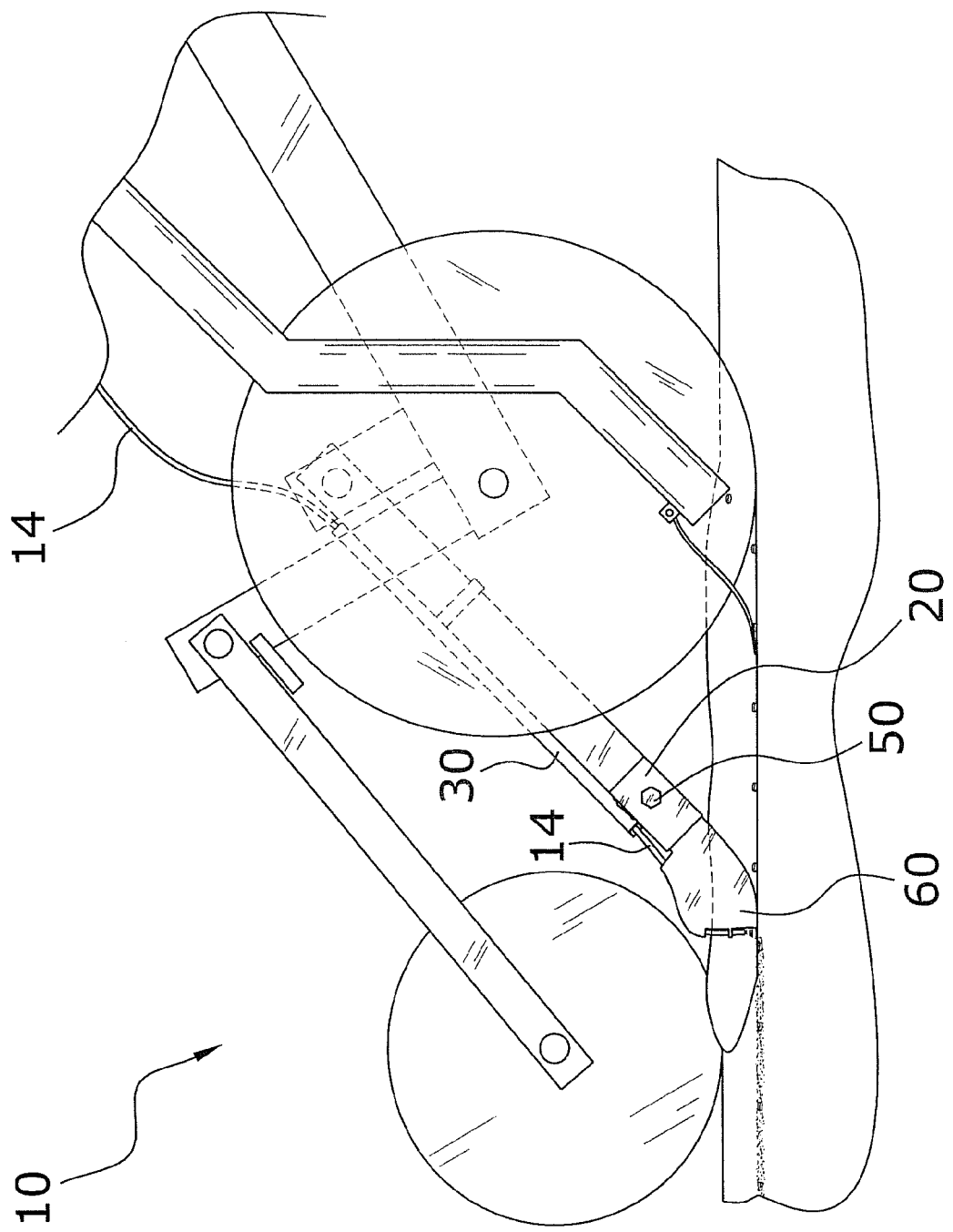
FIG. 8b is a side view of the present invention attached to a no-till drill in use and illustrating the seed bed.
Figure 9:
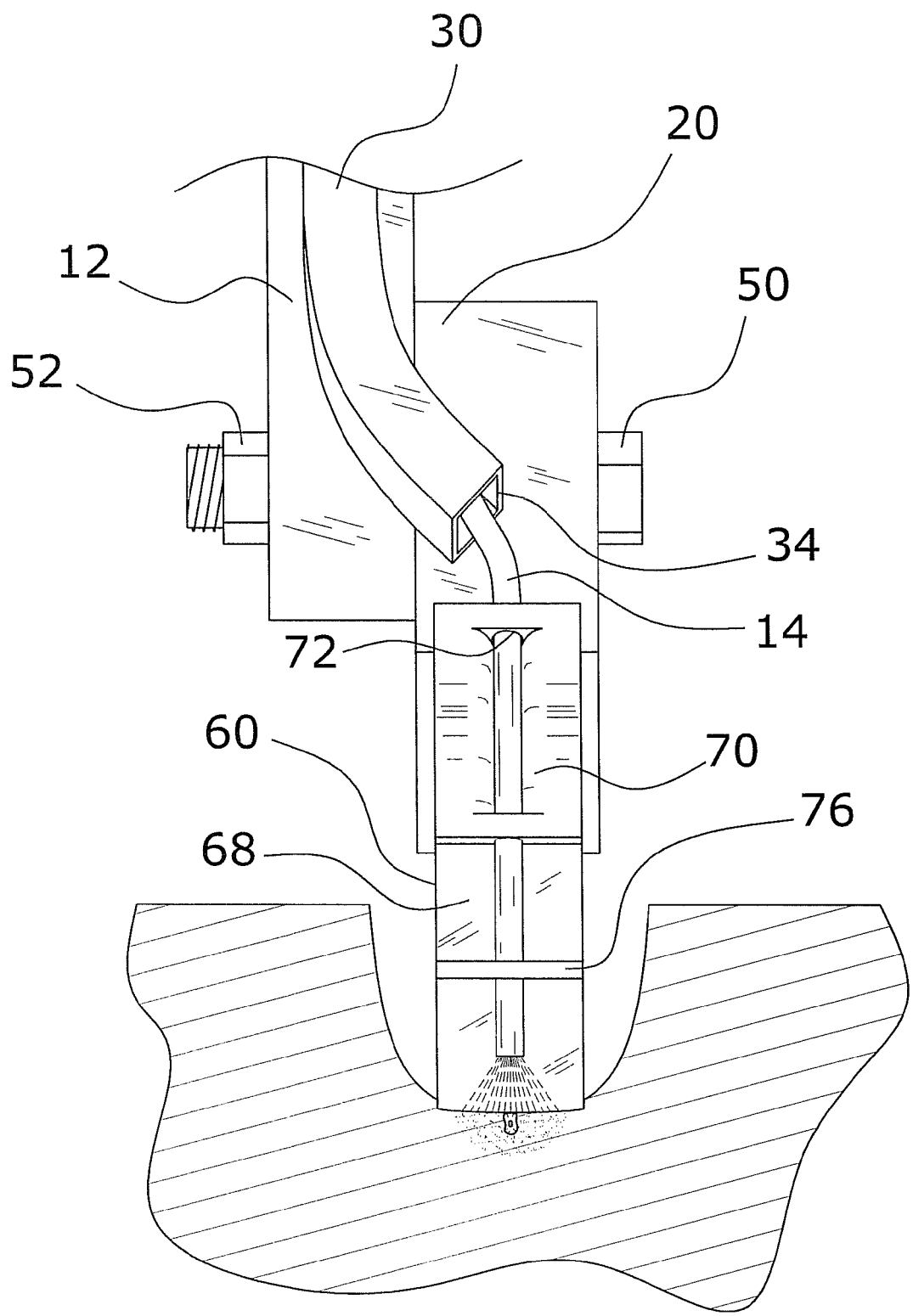
FIG. 9 is a rear view of the present invention applying liquid fertilizer to a seed bed.

In use, the present invention is first attached in a plurality of locations on the no-till drill (or other type of drill). The collar 40 is first positioned over the end of the shaft 12 in a slidable manner until the first aperture 22 of the receiver tube 20 is aligned with a corresponding aperture within the shaft 12. The user then inserts the wear member 60 until the second aperture 62 is aligned with the first aperture 22 (and the aperture within the shaft 12). It can be appreciated that the wear member 60 may be inserted into the receiver tube 20 prior to aligning with the shaft 12 of the no-till drill. Once the apertures are aligned, the user then inserts at least one fastener 50 through the apertures and secures the same with a nut 52 as shown in FIG. 7 of the drawings. The receiver tube 20 and wear member 60 are thereafter attached to the shaft 12 of the no-till drill. The collar 40 prevents rotational movement of the receiver tube 20 about the fastener 50. The receiver tube 20 preferably is adjacent or substantially close to an upper surface of the shaft 12 which also assists in preventing rotation of the receiver tube 20 as shown in FIGS. 7, 8a and 9 of the drawings.

After the present invention is attached, the user then takes the fertilizer tube 14 and extends the fertilizer tube 14 through the first end 32 of the receiver tube 20 until the fertilizer tube 14 extends out from the second end 34 of the receiver tube 20. The user continues to draw the fertilizer tube 14 through the receiver tube 20 then through the first guide aperture 72 within the wear member 60. The user then extends the fertilizer tube 14 to within the guide channel 70 and then through the second guide aperture 74 as shown in FIG. 7 of the drawings. The user then draws the end portion of the fertilizer tube 14 downwardly through the aperture within the lower guide member 76 and adjusts the length of the fertilizer tube 14 so that the distal end thereof is at least above the lower surface 66 of the wear member 60 as shown in FIG. 7 of the drawings. This process is repeated for each fertilizer section on the no-till drill.

After installation is completed, the no-till drill is operated in its normal manner. As the furrow is created by the discs and the seeds are dispensed into the furrow, the wear member 60 depresses the seeds into the seed bed so they are slightly covered with dirt. The dispensing end of the fertilizer tube 14 is on the rear portion 68 of the wear member 60 and thereafter dispenses the liquid fertilizer upon the seed bed which in turn reaches the seed for facilitating growth thereof. The wear member 60 further prevents the liquid fertilizer from being directly applied to the seed by the covering of the seed by the wear member 60. If a rock is engaged by the wear member 60, the wear member 60 is elevated accordingly and prevents the rock from engaging the fertilizer tube 14.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A no-till drill liquid fertilizer applicator system, comprising:
   a receiver tube including a receiver opening;
   a guide tube attached to said receiver tube to receive a fertilizer tube; and
   a wear member removably received within said receiver opening of said receiver tube, wherein said wear member receives an end portion of said fertilizer tube and wherein said fertilizer tube terminates adjacent to a rear portion of said wear member.

2. The no-till drill liquid fertilizer applicator system of claim 1, wherein said wear member includes a guide channel for receiving said end portion of said fertilizer tube.

3. The no-till drill liquid fertilizer applicator system of claim 2, wherein said guide channel extends along an upper portion of said wear member to said rear portion.

4. The no-till drill liquid fertilizer applicator system of claim 3, including a first guide aperture within said wear member connected to said guide channel, wherein said first guide aperture receives said fertilizer tube and wherein said first guide aperture is substantially parallel to an initial path of said guide channel.

5. The no-till drill liquid fertilizer applicator system of claim 4, including a second guide aperture within said wear member connected to said guide channel, wherein said second guide aperture receives said fertilizer tube and wherein said second guide aperture is substantially parallel to an end path of said guide channel.

6. The no-till drill liquid fertilizer applicator system of claim 2, including a lower guide member extending from said rear portion of said wear member.

7. The no-till drill liquid fertilizer applicator system of claim 6, wherein said lower guide member includes an aperture that receives said end portion of said fertilizer tube.

8. The no-till drill liquid fertilizer applicator system of claim 2, wherein said guide channel has a rounded cross sectional structure.

9. The no-till drill liquid fertilizer applicator system of claim 2, wherein said guide channel has a depth equal to at least a diameter of said fertilizer tube.

10. The no-till drill liquid fertilizer applicator system of claim 1, wherein said guide tube is comprised of an elongated structure having a first end and a second end, wherein said fertilizer tube enters said first end and exits said second end.

11. The no-till drill liquid fertilizer applicator system of claim 1, including a collar attached to said guide tube, wherein said guide tube is to receive a shaft of a no-till drill.

12. The no-till drill liquid fertilizer applicator system of claim 11, wherein said collar is comprised of a rectangular structure.

13. The no-till drill liquid fertilizer applicator system of claim 1, wherein said receiver tube includes a first aperture, wherein said wear member includes a second aperture aligned with said first aperture, wherein a fastener is extended through said first aperture and said second aperture for securing said wear member within said receiver tube.

14. The no-till drill liquid fertilizer applicator system of claim 1, wherein said receiver opening is comprised of a rectangular cross section.

15. The no-till drill liquid fertilizer applicator system of claim 1, wherein said wear member includes a neck portion that has a cross sectional shape corresponding to said receiver opening.

16. The no-till drill liquid fertilizer applicator system of claim 15, wherein said neck portion is narrower than a main body of said wear member.

17. The no-till drill liquid fertilizer applicator system of claim 1, wherein said wear member has a lower surface that engages a ground surface.

18. The no-till drill liquid fertilizer applicator system of claim 1, wherein said wear member includes a tapered leading edge.

19. A no-till drill liquid fertilizer applicator system, comprising:

a receiver tube including a receiver opening;

a guide tube attached to said receiver tube to receive a fertilizer tube, wherein said guide tube is comprised of an elongated structure having a first end and a second end, wherein said fertilizer tube enters said first end and exits said second end;

a wear member removably received within said receiver opening of said receiver tube, wherein said wear member receives an end portion of said fertilizer tube, and wherein said fertilizer tube terminates adjacent to a rear portion of said wear member;

wherein said wear member has a lower surface that engages a ground surface and a tapered leading edge;

a guide channel within said wear member for receiving said end portion of said fertilizer tube, wherein said guide channel extends along an upper portion of said wear member to said rear portion, wherein said guide channel has a rounded cross sectional structure, and wherein said guide channel has a depth equal to at least a diameter of said fertilizer tube;

a first guide aperture within said wear member connected to said guide channel, wherein said first guide aperture receives said fertilizer tube and wherein said first guide aperture is substantially parallel to an initial path of said guide channel;

a second guide aperture within said wear member connected to said guide channel, wherein said second guide aperture receives said fertilizer tube and wherein said second guide aperture is substantially parallel to an end path of said guide channel;

a lower guide member extending from said rear portion of said wear member, wherein said lower guide member includes an aperture that receives said end portion of said fertilizer tube;

a collar attached to said guide tube, wherein said collar is formed is to receive a shaft of a no-till drill, wherein said collar is comprised of a rectangular structure;

wherein said receiver tube includes a first aperture, wherein said wear member includes a second aperture aligned with said first aperture, wherein a fastener is extended through said first aperture and said second aperture for securing said wear member within said receiver tube;

wherein said receiver opening is comprised of a rectangular cross section;

wherein said wear member includes a neck portion that has a cross sectional shape corresponding to said receiver opening; and wherein said neck portion is narrower than a main body of said wear member.

* * * * *